W. G. WISE.
EMERGENCY WHEEL FOR VEHICLES.
APPLICATION FILED SEPT. 3, 1913.

1,118,611.

Patented Nov. 24, 1914.

WITNESSES:
Charles Pickles
R. S. Burns

INVENTOR
William G. Wise
BY G. H. Strong,
ATTORNEY

UNITED STATES PATENT OFFICE.

WILLIAM G. WISE, OF SANTA CLARA, CALIFORNIA.

EMERGENCY-WHEEL FOR VEHICLES.

1,118,611.  Specification of Letters Patent.  Patented Nov. 24, 1914.

Application filed September 3, 1913. Serial No. 787,919.

*To all whom it may concern:*

Be it known that I, WILLIAM G. WISE, a citizen of the United States, residing at Santa Clara, in the county of Santa Clara and State of California, have invented new and useful Improvements in Emergency-Wheels for Vehicles, of which the following is a specification.

This invention relates to an emergency runner for vehicles.

It is the object of this invention to provide a runner for use on vehicles such as automobiles, motor trucks and the like, in event one or more of the vehicle wheels, spindles, or other parts of the running gear, become disabled, and which runner is so constructed that it can be easily and quickly substituted for a broken wheel, to enable the vehicle being moved an extensive distance.

A further object is to provide a runner of the above character which is simple in construction, which can be taken apart and packed in a small space, and which is strong, durable, and can be economically manufactured.

The invention primarily resides in a frame supported on a pair of caster wheels, means for attaching the frame to a vehicle axle, and means for bracing the frame against lateral movement.

The invention further consists of the parts and the construction and combination of parts, as hereinafter more fully described and claimed, having reference to the accompanying drawings, in which,—

Figure 1:
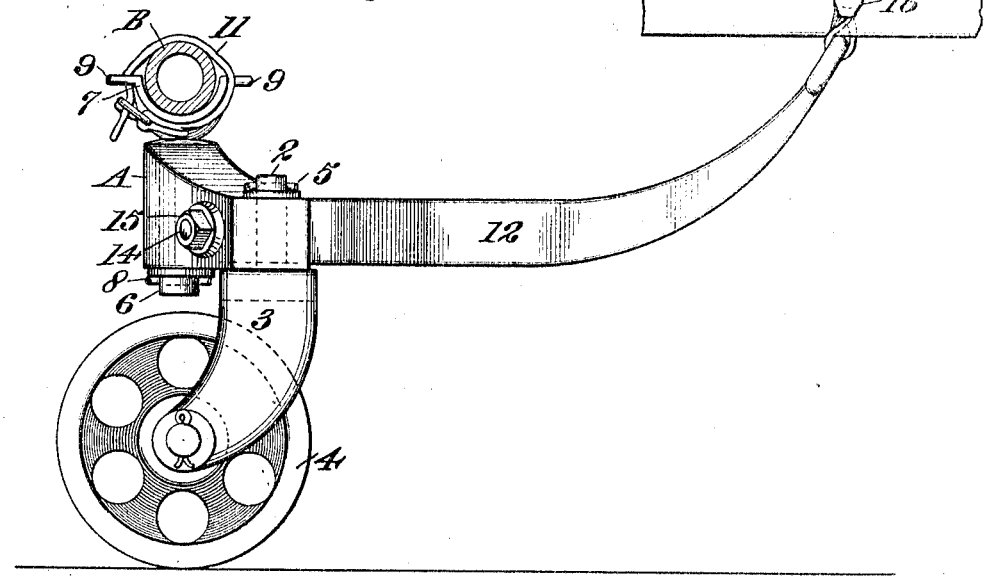
Figure 2:
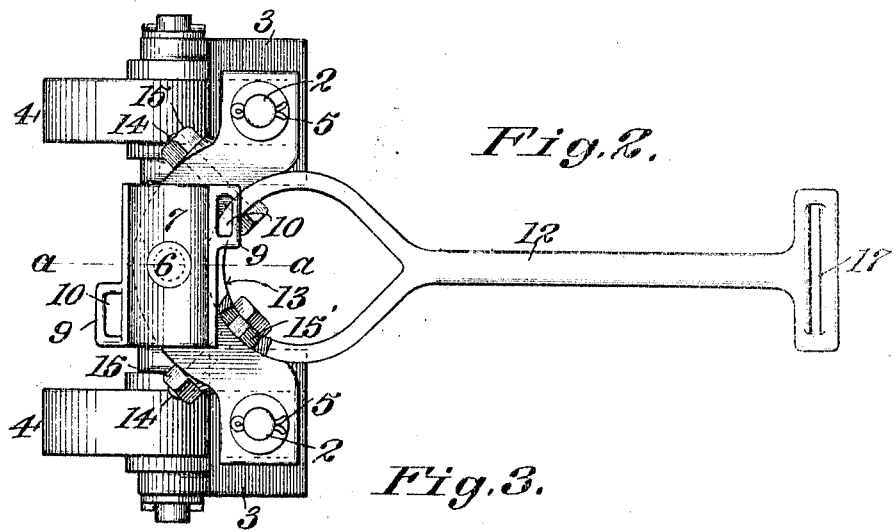
Figure 3:
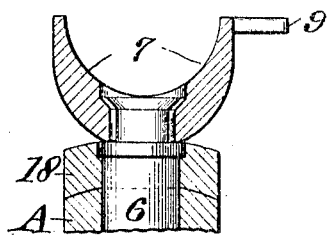

Figure 1 is a side elevation of the invention as applied. Fig. 2 is a plan view. Fig. 3 is a detail section on the line a—a of Fig. 2.

In the drawings A represents the runner frame which is segmental in plan and is arched at the center of its upper face. The outer ends of the frame A are formed with vertical openings to receive spindles 2 on yokes 3, in which caster wheels 4 are revolubly mounted. The spindles 2 are retained in place in the frame A by means of cotterpins 5 which pass through transverse perforations in the spindles 2, as shown in Fig. 1, which pins can be readily removed when it is desired to detach the frame A from the caster wheels. A vertical perforation is also formed centrally of the frame A to receive a spindle 6, the upper end of which is swiveled to a saddle 7; the saddle 7 having a hemispherical under-face adapted to contact with a collar 6ª on the spindle 6, which collar is flush with the crown face on the arched portion of the frame A to form a rockable support for the saddle 7 and permit of a slight oscillating movement of the saddle in relation to the spindle 6. The spindle 6 is held in place on the frame A by means of a cotterpin 8 which passes through a perforation formed in the spindle 6 below the underside of the frame A, as shown in Fig. 1. The saddle 7 has a concave channel extending longitudinally thereof for the reception of an axle B, or other portion of a vehicle.

Formed on the marginal edges of the channel in the saddle are horizontally extending flanges 9, which are perforated at 10 to receive straps 11, or other fastening devices, which are passed through the perforations or eyelets 10 and around the saddle 7 and member B to bind the member B and saddle 7 together, as shown in Fig. 1. The eyelets 10 are provided as a means for preventing the straps 11, or other binding means, from shifting longitudinally of the saddle 7 so that they will not be accidentally moved clear of the saddle and thus be rendered ineffective.

Means are provided for preventing rocking movement of the frame A either vertically or horizontally when the device is attached to a vehicle. This means consists of an arm 12, having an arcuate inner end 13 adapted to extend into and lie against the curved inner face of the frame A. The arm 12 is rigidly attached to the frame A by means of bolts 14 which pass through slots 15' in the arcuate portions 13 of the arm and extend through horizontal perforations in the frame A; nuts 15 being screwed on the outer ends of the bolts 14 to clamp the arm 12 against movement. The slots 15' are of such length that the arm 12 may be adjusted at various angles in relation to the frame A, so as to dispose its outer end at any desired point. This construction is provided for the purpose of permitting the outer end of the arm 12 being lashed to a member C of the vehicle; a strap 16 passing through a slot 17 on the outer end of the arm 12 being provided for the purpose of lashing the arm 12 to the member C.

It will be seen that by removing the bolts 14 and the cotter-pins 5 and 8, the frame A, caster wheels 3, saddle 7 and arm 12 may be separated so that the device can be readily packed in a small space.

In the application of the invention the parts being assembled, as shown in Fig. 1, when a wheel on a vehicle becomes broken or otherwise rendered ineffective, the wheel is removed and the axle is placed in the saddle 7 and lashed thereto by means of the straps 11. The arm 12 is then adjusted in such position in relation to the frame A as to permit its outer end being lashed to some portion of the vehicle by means of straps 16; the outer end of the arm 12 being preferably connected either to the springs of the vehicle or to the frame thereof. When thus secured in place the frame A will be effectively held against extensive horizontal or vertical rocking movement, a slight oscillation of the frame A in relation to the axle B and the member C being permitted by reason of the flexible nature of the straps 11 and 16. A slight rocking movement of the axle B in relation to the frame A is also permitted by reason of the curvature at the points of contact between the saddle 7 and the frame A. When thus attached the vehicle can be freely moved with the caster wheels 4 serving as substitutes for the removed wheel. By providing a pair of spaced caster wheels at each end of the frame A, stability of the device is insured. This construction also enables the carrying of a considerable load upon a runner of comparatively light construction.

In event it is necessary to vary the height of the saddle 7 so as to accommodate it to axles B at various levels, a filler block 18 is employed, as shown in Fig. 3; this filler block being placed upon the upper arched face of the frame A so as to surround the spindle 6 and form a seat for the saddle 7. Each runner is designed to be provided with a series of blocks or spacers 18 of different heights, so that the device may be made to accommodate various vehicles without any alteration or change in construction.

Having thus described my invention what I claim and desire to secure by Letters Patent, is:

1. An apparatus of the character described including a horizontally curved frame, upwardly arched at the center, a concavo-convex axle support pivoted and rockable upon the top of the arch, and caster wheels with vertical stems turnable in the ends of the frame.

2. An apparatus of the character described including a horizontally curved frame, upwardly arched at the center, a concavo-convex axle support pivoted and rockable upon the top of the arch, said axle support having perforated lugs at each side and flexible binding straps adapted to pass through the lugs to secure the axle, supporting wheels at the ends of the frame, an arm secured to the frame, and means for connecting said arm with the main portion of a vehicle frame.

3. An emergency truck, comprising a horizontally curved and vertically arched frame mounted upon wheels at its opposite ends, a concavo-convex axle support rockably pivoted upon the top of said frame, an arm having its rear end curved and adjustably secured in the concavity of the frame, and means at the front end of said arm to secure it to the main vehicle frame in the line of travel of the machine.

In testimony whereof I have hereunto set my hand in the presence of two subscribing witnesses.

WILLIAM G. WISE.

Witnesses:
WILLIAM T. HEVEL,
WILLIAM P. MAY.